United States Patent [19]

Sikora

[11] Patent Number: 4,755,723
[45] Date of Patent: Jul. 5, 1988

[54] STROBE FLASH LAMP POWER SUPPLY WITH AFTERGLOW PREVENTION CIRCUIT

[75] Inventor: Scott T. Sikora, Mesa, Ariz.

[73] Assignee: Tomar Electronics, Inc., Tempe, Ariz.

[21] Appl. No.: 42,304

[22] Filed: Apr. 24, 1987

Related U.S. Application Data

[63] Continuation-in-part of Ser. No. 794,415, Nov. 4, 1985, Pat. No. 4,682,081.

[51] Int. Cl.$^4$ .................... H05B 41/29; H05B 41/34
[52] U.S. Cl. .................... 315/219; 315/241 S; 363/19; 363/131
[58] Field of Search ............... 315/241 S, 241 R, 219; 383/18–21, 97, 131; 331/121

[56] References Cited

U.S. PATENT DOCUMENTS

| | | | |
|---|---|---|---|
| 3,331,033 | 7/1968 | Johnston | 363/18 |
| 3,417,306 | 12/1968 | Knak | 363/21 |
| 3,515,974 | 6/1970 | Stich | 363/19 |
| 3,523,235 | 8/1970 | Schaefer | 363/19 |
| 4,135,233 | 1/1979 | Seiersen | 363/21 |
| 4,321,507 | 3/1982 | Bosnak | 315/241 R |
| 4,573,112 | 2/1986 | Nomata et al. | 363/19 |
| 4,595,974 | 6/1986 | Lethellier | 363/97 |
| 4,613,797 | 9/1986 | Eggess et al. | 315/241 S |
| 4,682,081 | 7/1987 | Sikora | 315/219 |

Primary Examiner—David K. Moore
Assistant Examiner—Michael Razavi
Attorney, Agent, or Firm—Cahill, Sutton & Thomas

[57] ABSTRACT

A variable frequency DC to DC converter generates a pulsed, variable magnitude output voltage where the frequency of the pulsed output voltage varies with changes in the magnitude of the output voltage. An energy storage capacitor is coupled between the converter coupled inductor and strobe flash lamp or other gaseous discharge tube and is periodically discharged through the flash lamp. A variable impedance device in the form of a capacitor is coupled in series with the flow of current from the coupled inductor into the energy storage capacitor to provide a low impedance current flow path when energy is transferred from the coupled inductor into the capacitor and to provide a high impedance current flow path between the converter DC voltage input terminals and the energy storage capacitor when energy is transferred from the capacitor into the strobe flash lamp.

7 Claims, 7 Drawing Sheets

STROBE FLASH LAMP POWER SUPPLY WITH AFTERGLOW PREVENTION CIRCUIT

This application is a continuation-in-part of allowed U.S. patent application Ser. No. 794,415, now U.S. Pat. No. 4,682,081, filed on Apr. 11, 1985. The disclosure of that allowed patent application is hereby incorporated by reference.

BACKGROUND OF THE INVENTION

1. Field of the Invention

This invention relates to power supplies, and more particularly to DC to DC converter circuits commonly utilized to energize gaseous discharge tubes in the form of strobe flash lamps.

2. Description of the Prior Art

Prior art DC to DC converter circuits of the type utilized to energize strobe flash lamps are typically designed to operate at a single input voltage. For vehicular applications, such power supplies are typically designed to operate at either one of the following input voltage levels: twelve volts DC, twenty-four volts DC, thirty-six volts DC or forty-eight volts DC. A wholesaler or distributor who supplies vehicular-mounted strobe power supplies must normally carry an inventory of strobe power supply circuits for each of these four distinct and previously incompatible power supply input voltage ratings.

Strobe power supplies for vehicular applications typically include DC to DC converter circuits using a coupled inductor having primary and feedback windings which are controlled by a switching transistor coupled in series with the current flow path of the primary winding. In all cases, it is necessary to miniaturize such power supply circuits to the maximum extent possible to render them compatible with vehicular installations. In addition, the efficiency of these power supply circuits must be as high as possible due to the relatively limited electrical power generating capacity of the vehicles on which such power supply circuits are mounted. As is always the case, the cost of such circuits must be kept as low as possible and the reliability of these circuits which are exposed to extreme environmental conditions must be as high as possible.

From the customer and distributor standpoint, this prior art solution to the numerous problems addressed above has been begrudgingly accepted, but the additional cost and inconvenience caused by the requirement for stocking and using four different input voltage capacity power supplies has long been recognized.

SUMMARY OF THE INVENTION

It is therefore a primary object of the present invention to provide a drive current regulator circuit for a variable input voltage DC to DC converter for supplying a constant base drive current to the converter circuit switching transistor which does not vary in response to substantial changes in the converter DC input voltage.

Another object of the present invention is to provide a drive current regulator circuit for a variable input voltage DC to DC converter which couples a constant current source to the feedback winding of the converter coupled inductor to provide a constant base drive current to the converter switching transistor regardless of feedback winding voltage or the converter DC input voltage.

Another object of the present invention is to provide a drive current regulator circuit for a variable input voltage DC to DC converter which can provide a constant, optimum level base drive current to the converter switching transistor to maintain optimum, highest efficiency performance of the converter circuit where circuit performance is essentially insensitive to substantial variations in the converter DC input voltage.

Another object of the present invention is to provide an afterglow prevention circuit for a DC to DC converter which prevents strobe flash lamp afterglow caused by the transfer of high level converter DC input voltages to the flash lamp during the time interval immediately after the converter energy storage capacitor has completed its discharge cycle through the strobe flash lamp to thereby prevent afterglow.

Another object of the present invention is to provide an afterglow prevention circuit for a DC to DC converter which utilizes a variable impedance device in the form of a capacitor placed in series between the converter switching transistor and the converter energy storage capacitor to provide a low impedance path between the primary winding of the converter coupled inductor and the energy storage capacitor when the converter operates at high frequencies and to provide a high impedance path between the primary winding of the coupled inductor and the energy storage capacitor when the converter operates at low frequencies.

Another object of the present invention is to provide an afterglow prevention circuit for a DC to DC converter which can readily be adapted to function in connection with prior art DC to DC converter circuits to totally eliminate afterglow problems caused by power supply input voltage feed through to an ionized strobe flash lamp at the end of the energy storage capacitor discharge cycle.

Another object of the present invention is to provide an overvoltage protection circuit for a DC to DC converter which limits the maximum converter output voltage without affecting the operating efficiency of the converter circuit.

Another object of the present invention is to provide an overvoltage protection circuit for a DC to DC converter which can be added to prior art DC to DC converter circuits without modification of the existing circuitry and with the addition of only a limited number of additional circuit elements.

Another object of the present invention is to provide an overvoltage protection circuit for a DC to DC converter which utilizes a semiconductor device in the form of a sidac having a breakover voltage and a negative resistance region.

Another object of the present invention is to provide an overvoltage protection circuit for a DC to DC converter which completely terminates the operation of the converter switching transistor for a predetermined time period enabling the energy storage capacitor output voltage to be decreased to a level below the maximum desired output voltage before the converter switching transistor is once again enabled to commence normal operation.

Briefly stated, and in accord with one embodiment of the invention, a DC to DC converter delivers current to an intermittently energized gaseous discharge tube having a low impedance conductive state and a high impedance non-conductive state. The converter generates a pulsed, variable magnitude output voltage and operates at frequencies which vary in response to changes in the magnitude of the converter output voltage. Energy storage means, typically in the form of an energy storage capacitor, is coupled between the DC to DC converter and the gaseous discharge tube and periodically receives and stores energy from the converter when the gaseous discharge tube is in the non-conductive state and periodically transfers energy into the gaseous discharge tube when the tube is in the conductive state. Variable impedance means typically taking the form of a capacitor is coupled in series with a flow of current from the converter circuit to the energy storage means in order to provide a low impedance current flow path between the converter and the energy storage means while energy is transferred from the converter into the energy storage means. The variable impedance means also provide a high impedance current flow path between the converter and the energy storage means shortly after the gaseous discharge tube transitions into the conductive state to thereby prevent the converter from maintaining the gaseous discharge tube in the conductive state after the transfer of energy from the energy storage means into the gaseous discharge tube has been completed.

DESCRIPTION OF THE DRAWINGS

The invention is pointed out with particularly in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, a preferred hardware embodiment of the invention will now be described in detail.

Figures 1, 2:
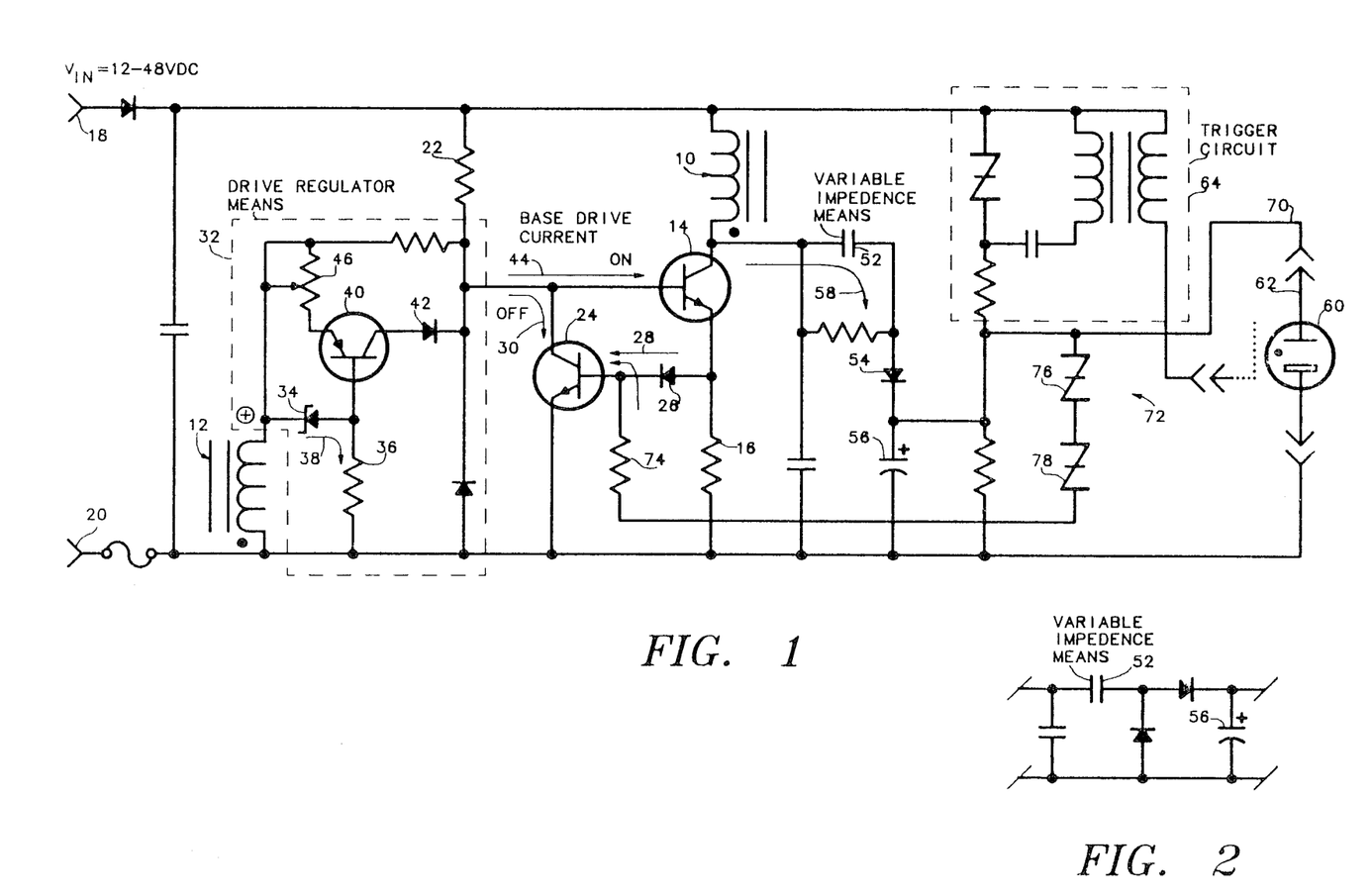
FIG. 1 is a schematic diagram of a first preferred embodiment of the invention including the drive current regulator circuit, the afterglow prevention circuit and the overvoltage protection circuit aspects of the present invention.
FIG. 2 is a partial schematic diagram depicting an alternative preferred embodiment of the afterglow prevention circuit of the present invention which operates in combination with the overvoltage protection circuit of the present invention to maintain a constant magnitude energy discharge into the strobe flash lamp regardless of variations in the DC to DC converter circuit input voltage.

Referring now to FIG. 1, the DC to DC converter of the present invention includes a coupled inductor having a primary winding 10 and a feedback winding 12. The collector terminal of a switching transistor 14 is coupled to primary winding 10 while the emitter of that transistor is coupled to ground through emitter load resistor 16.

An input voltage residing generally between the range of twelve to forty-eight volts DC is coupled across voltage input terminal 18 and ground terminal 20. A starting base bias current is provided to the base terminal of switching transistor 14 by current flow through resistor 22. This starting bias current turns switching transistor 14 on and causes the current through transistor 14 to increase. When the current level through switching transistor 14 reaches a predetermined maximum value, the voltage on emitter resistor 16 activates power supply disabling means which includes transistor 24 and diode 26. The value of emitter resistor 16 is selected so that diode 26 commences conducting current at exactly the point when the collector current of switching transistor 14 reaches the maximum desired value. The flow of current through diode 26 indicated by current flow arrow 28 turns on transistor 24 and shunts all base drive current to ground as indicated by current flow arrow 30.

As current initially begins to flow through primary winding 10 and switching transistor 14, a positive voltage is generated across feedback winding 12 as indicated by the "+" sign depicted in FIG. 1. This positive voltage is coupled to the input terminal of drive regulator means 32 which includes a constant voltage biasing network including zener diode 34 and resistor 36. The configuration of the coupled inductor including primary winding 10 and feedback winding 12, the turns ratios of these windings and related transformer design parameters are configured so that the positive voltage generated by feedback winding 12 immediately causes zener diode 34 to break down and begin conducting current as indicated by current flow arrow 38. This constant voltage biasing network produces a constant bias voltage which does not vary in response to changes in the converter input voltage within the design parameters of twelve to forty-eight volts DC. This constant bias voltage point is directly coupled to the base of constant current transistor 40. Transistor 40 immediately begins generating a constant current output which is directed through diode 42 and into the base terminal of switching transistor 14 as indicated by current flow arrow 44. The arrival of this base drive current on the base terminal of switching transistor 14 maintains transistor 14 in the "on" or conductive state until transistor 24 of the power supply disabling means is once again activated to shunt the base drive current to ground in response to the bias voltage produced across emitter resistor 16.

The magnitude of the base drive current produced by drive regulator means 32 can be adjusted between minimum and maximum allowable levels or to an optimum base drive level by adjusting potentiometer 46.

Figures 7A, 7B:
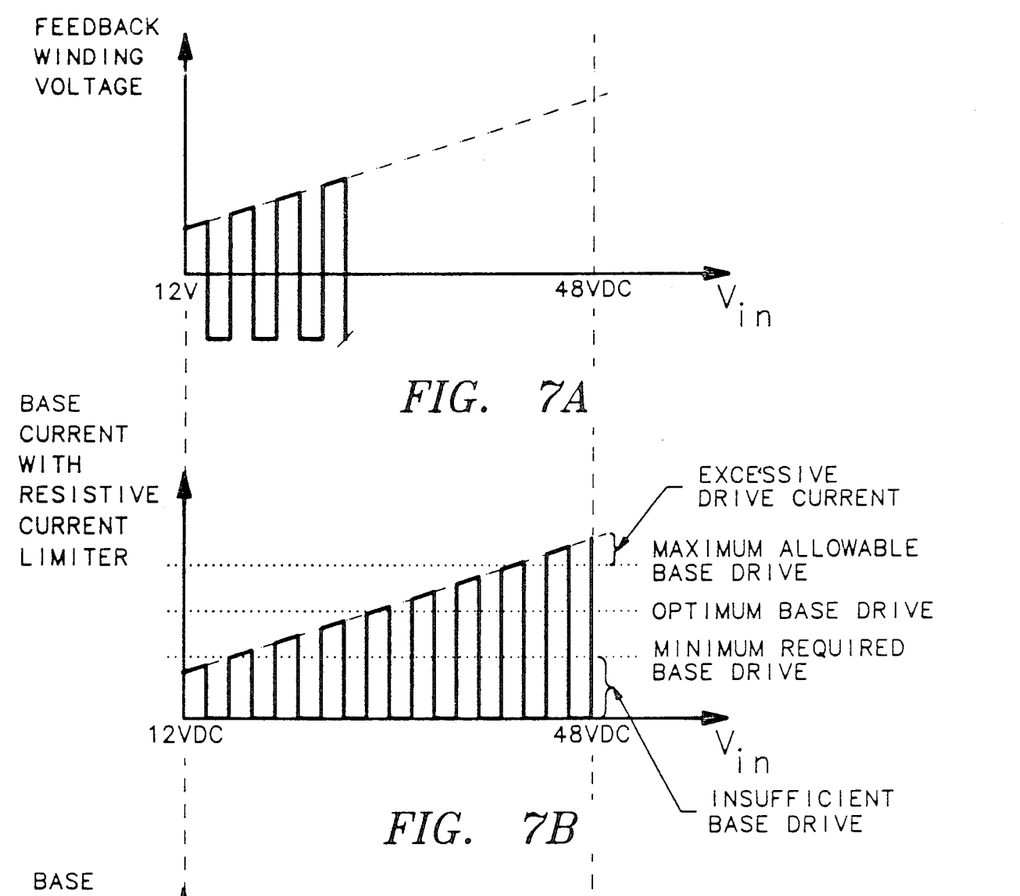
FIGS. 7A graphically illustrates variations in feedback winding voltage with respect to variations in input voltage.
FIG. 7B illustrates variations in the FIG. 6 switching transistor base current in response to variations in the converter input voltage.

Referring now to FIG. 7, FIG. 7A illustrates the changes in feedback winding voltage produced in response to changes in the converter input voltage and illustrates the manner in which the feedback winding voltage increases in response to increases in the converter input voltage.

Figure 6:
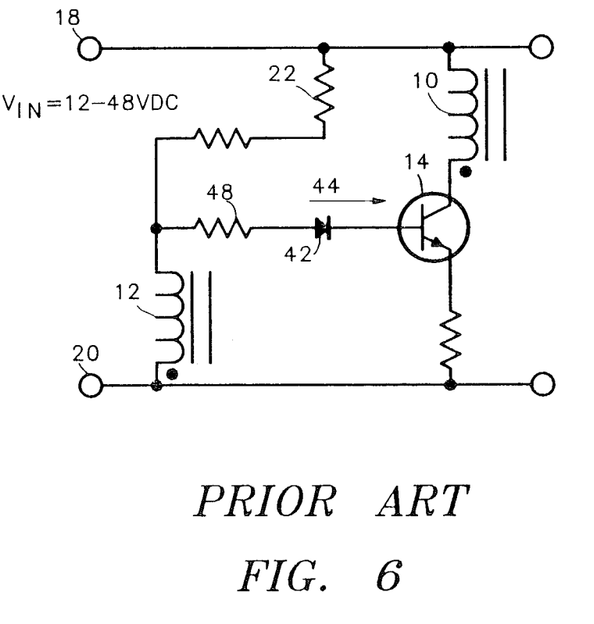
FIG. 6 represents a partial schematic diagram of a prior art resistive biasing circuit for a DC to DC converter.

FIG. 7B illustrates the manner in which the base drive current 44 generated by the FIG. 6 prior art resistive drive regulator circuit varies linearly in response to changes in the converter input voltage. For a comparatively low input voltage such as twelve volts, FIG. 7B indicates that the base drive current produced by the prior art FIG. 6 circuit fails to meet the minimum required base drive requirements of switching transistor 14 and would therefore fail to properly operate switching transistor 14. For intermediate level input voltages on the order of twenty-four to thirty-six volts, the base drive current provided by the FIG. 6 prior art circuit varies either below or above the desired optimum base drive current. For higher levels of input voltage on the order of about forty-eight volts DC, FIG. 7B illustrates that the FIG. 6 prior art base drive circuit produces levels of base drive current in excess of the maximum allowable drive level. Excess base drive can cause excessive switching transistor current loads, excessive switching transistor temperatures due to extended transistor storage time and typically results in damage or failure of various system components.

A significant additional problem experienced by the FIG. 6 prior art base drive circuit relates to the power dissipated by base drive resistor 48. With a four fold increase in converter input voltage from twelve to forty-eight volts, the current through resistor 48 increases four fold, but the power dissipated by resistor 48 increases sixteen fold. This creates serious problems relating to requirements for utilizing large, high power dissipation resistors and general circuit heat dissipation problems as well as reduced circuit efficiency resulting from the excessive power dissipation in resistor 48. In addition, as explained above in connection with FIG. 7B, the FIG. 6 resistive base drive regulation circuit is not capable of maintaining an optimum base drive current as the converter input voltage varies.

Figure 7C:
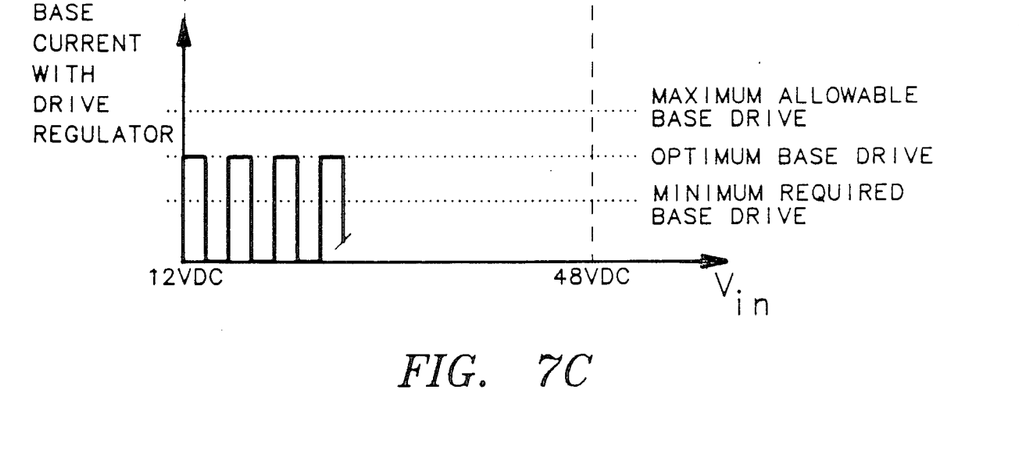
FIG. 7C illustrates the absence of variations of the switching transistor base drive current with respect to input voltage variations for the drive current regulator circuit of the present invention.

As indicated by the FIG. 7C plot of input voltage versus base drive current variations achieved by the drive regulator means 32 depicted in FIG. 1, the FIG. 1 circuit is able to provide an absolutely constant level of base drive current regardless of fluctuations in converter input voltage. Appropriate adjustments in potentiometer 46 or an appropriate selection of a fixed resistor value in place of potentiometer 46 can readily cause the FIG. 1 drive regulator means 32 to produce and maintain a constant base drive current for switching transistor 14 to cause that transistor to operate at optimum efficiency regardless of fluctuations of converter input voltage between the design values of from twelve to forty-eight volts DC. With appropriate modifications the circuit element parameters, drive regulator means 32 can readily be adapted to function for various different converter input voltage ranges in a manner well known to those of ordinary skill in the art.

Figure 8:
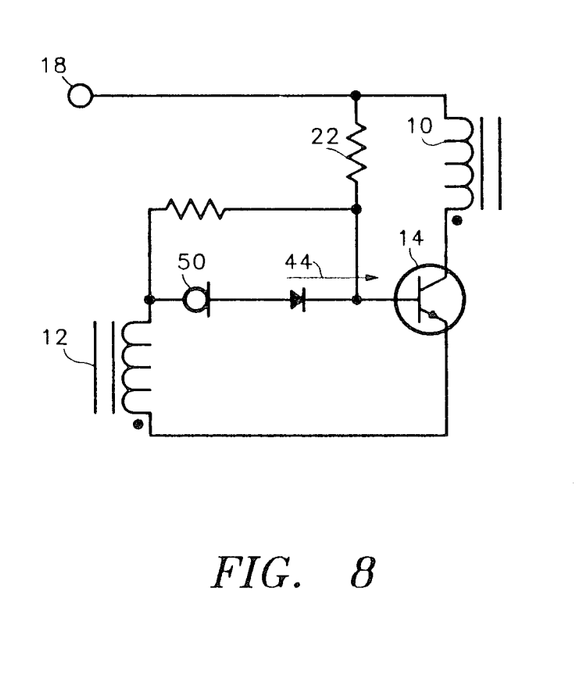
FIG. 8 is a partial schematic diagram illustrating the use of a constant current diode in the drive regulator circuit of the present invention in place of the more complicated constant current source drive regulator circuit depicted in the FIG. 1 schematic diagram.

Referring now to FIG. 8, an alternative embodiment of drive regulator means 32 is illustrated in which a constant current diode 50 has been substituted for the related circuit elements depicted in FIG. 1. With some limitations, constant current diode 50 has the capability of functioning to maintain the base drive current constant regardless of fluctuations in the converter input voltage.

Figure 4:
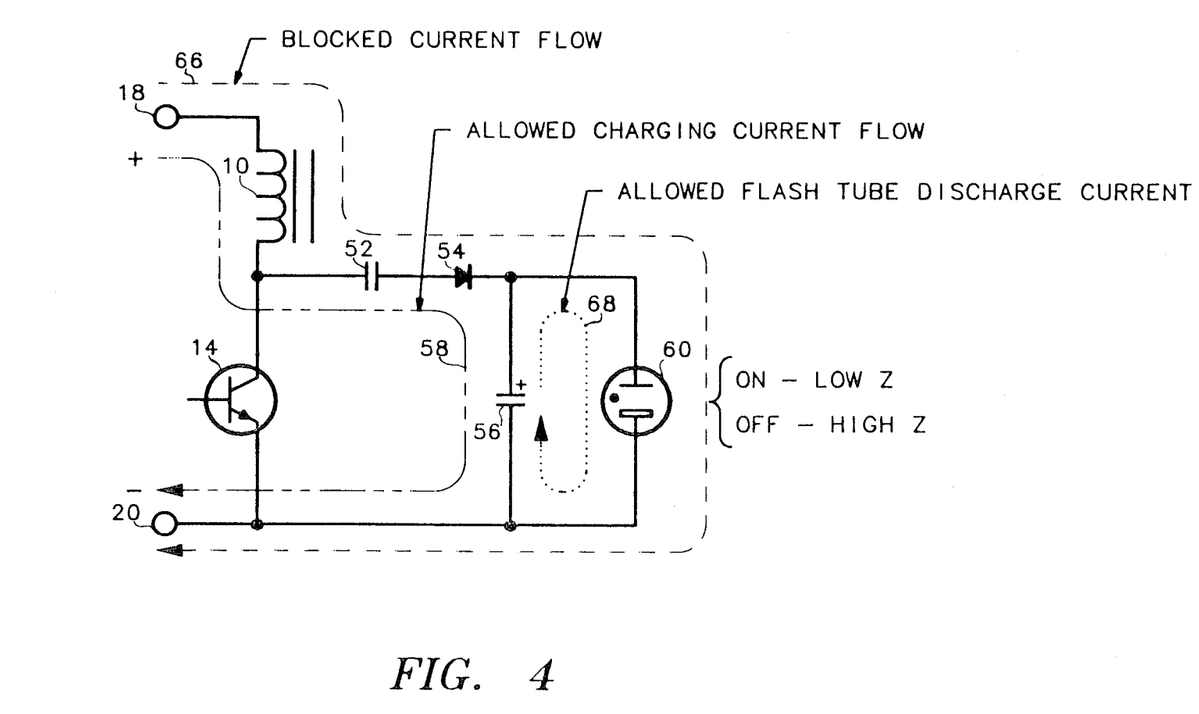
FIG. 4 is a partial schematic diagram of the FIG. 1 DC to DC converter circuit particularly illustrating the manner in which the variable impedance means of the present invention blocks current flow caused by the converter DC input voltage into the strobe flash lamp when it is in the ionized state.

Referring now to FIGS. 1 and 4, when switching transistor 14 is switched into the non-conductive state by base drive shunt transistor 24, current flows from primary winding 10 of the coupled inductor through variable impedance means 52 which typically assumes the form of capacitor 52. This current then flows through diode 54 into energy storage means or energy storage capacitor 56. This allowed charging current flow is illustrated in FIGS. 1 and 4 by current flow lines 58.

Figure 3:
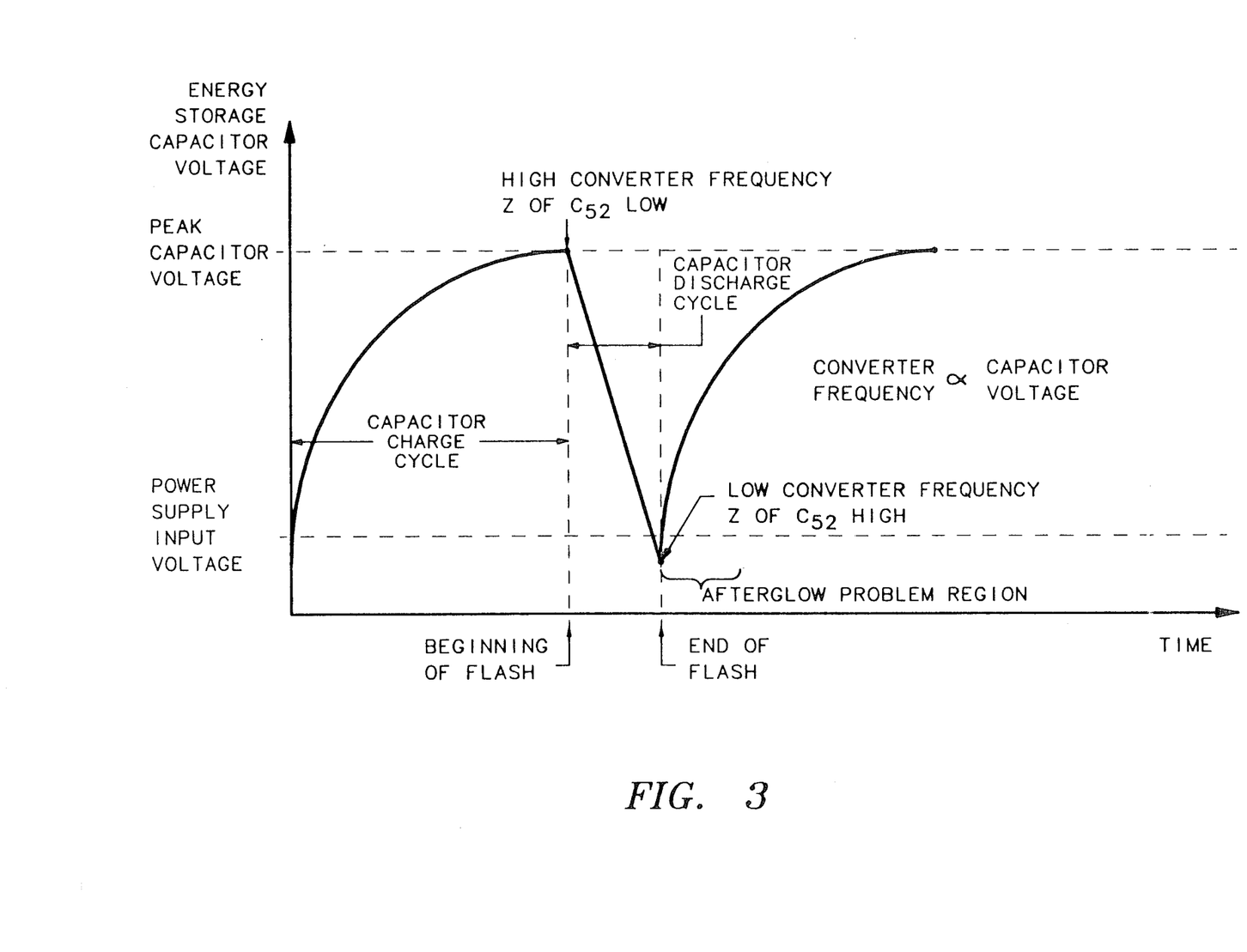
FIG. 3 is a timing diagram showing the relationship to time of the switching transistor operating frequency with respect to the energy storage capacitor voltage as well as the charge and discharge cycles of the converter energy storage capacitor.

According to well known transformer operating principles as applied to the converter circuit depicted in FIG. 1, a constant amount of energy is transferred from transformer 10 into capacitor 56 during each time interval that transistor 14 is maintained in the non-conductive state. Referring now also to FIG. 3, when the voltage on capacitor 56 is low as is the case at the beginning of the capacitor charge cycle, a comparatively long period of time is required to transfer a fixed amount of energy or energy from primary winding 10 into capacitor 56. Over a period of charging cycles, the voltage level of capacitor 56 gradually increases as depicted in FIG. 3 until capacitor 56 reaches its peak voltage at the end of a given charging cycle. At this particular point during the charging cycle, only a comparatively short time is required to transfer the fixed amount of energy from primary winding 10 into capacitor 56. The net result of this significant decrease in the time that switching transistor is maintained in the non-conductive state is that the operating frequency of switching transistor 14 varies from a comparatively low frequency on the order of about 5,000 to 10,000 Hertz to a comparatively high frequency on the order of about 40,000 to 50,000 Hertz for the preferred embodiment of the invention depicted in FIG. 1.

Variable impedance means or capacitor 52 is selected to have a comparatively high level impedance at the beginning of a charging cycle which as indicated in FIG. 3 corresponds directly with the end of the flash interval. Similarly, because of the substantial variation in operating frequency between the beginning and end of any charge cycle, variable impedance means or capacitor 52 can easily be selected to have a substantially lower impedance at the high operating frequency end of the charge cycle than was the case with its comparatively low impedance level at the beginning of the charge cycle. Because the voltage on capacitor 56 increases extremely rapidly at the beginning of the charge cycle, any adverse effect of the comparatively high impedance level of capacitor 52 at the beginning of the charge cycle is quickly eliminated.

Variable impedance means 52 was positioned as illustrated in FIGS. 1 and 2 and selected to have the impedance levels described above to prevent afterglow of flash lamp 60.

With prior art converter circuits, input voltages pass through primary winding 10 and are directly coupled to terminal 62 of flash lamp 60 regardless of the operating state of switching transistor 14. When the gaseous interior of flash lamp 60 is initially ionized by trigger circuit 64, the effective impedance of flash lamp 60 drops to an extremely low value on the order of a few Ohms. As illustrated by FIG. 3, upon initial ionization of flash lamp 60 by trigger circuit 64, energy storage means 56 rapidly discharges through flash lamp 60 to a low voltage level determined by the holding current of flash lamp 60. With high level converter input voltages on the order of forty-eight volts DC coupled directly to flash lamp 60, that input voltage by itself is able to maintain flash lamp 60 in the ionized state and creates afterglow illumination during the time interval illustrated in FIG. 3.

With the FIG. 1 circuit, variable impedance means 52 totally blocks the flow of DC current between converter input terminal 18 and flash lamp 60 and totally eliminates the afterglow problem common in prior art units as discussed above.

Referring now to FIG. 4, the dotted line identified by reference number 66 represents the blocked current flow from voltage input terminal 18 to flash lamp 60 achieved by variable impedance means 52. Without such current blocking, high input voltages on terminal 18 which would cause the undesirable afterglow problem described above. In addition, as indicated by reference number 68, energy storage means 56 is permitted to discharge in a normal manner through flash lamp 60 without any interference from variable impedance means 52. Because variable impedance means 52 essentially decouples the potentially high level converter input voltage from flash lamp 60, the termination of current discharge from energy storage means 56 causes the gaseous interior of flash lamp 60 to rapidly deionize which instantaneously terminates flash lamp illumination. As illustrated in FIG. 3, the converter immediately resumes its next capacitor charging cycle at that point in time.

Another design problem encountered and solved by the FIG. 1 circuit relates to problems arising from either burnout or removal of flash lamp 60. Either condition renders flash lamp 60 essentially invisible in the FIG. 1 circuit and the output voltage generated on output voltage conductor 70 begins an uncontrolled increase. If not stopped or otherwise controlled, this voltage increase will rapidly exceed the operating limitations of switching transistor 14 and energy storage capacitor 56 and result in serious damage to the power supply circuit.

In order to solve this circuit design problem, the FIG. 1 circuit incorporates an overvoltage protection circuit which includes output voltage sensing means consisting of series coupled semiconductor means 72 and biasing means 74.

Figure 5A:
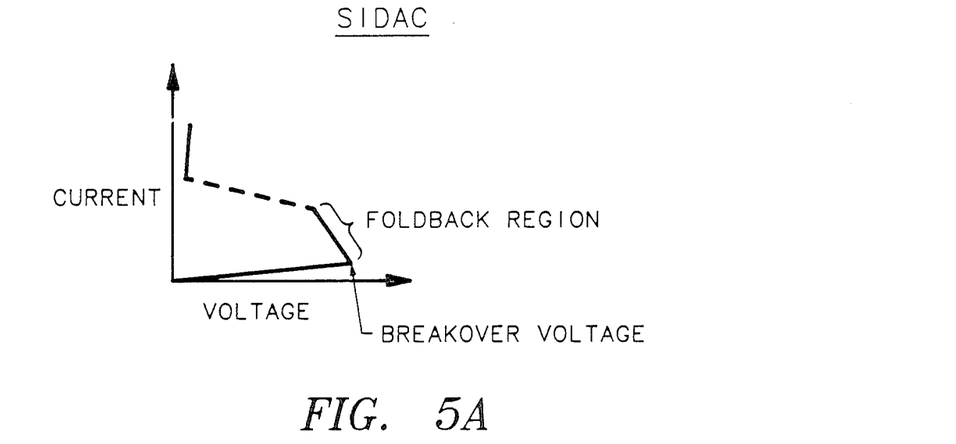
FIGS. 5A, 5B and 5C represent voltage versus current plots for negative resistance devices in the form of a sidac, a diac and a silicon bilateral switch which are capable of functioning in the overvoltage protection circuit of the present invention.

Semiconductor means 72 in the preferred embodiment of the invention takes the form of two series coupled sidacs 76 and 78. Sidac 76 is coupled to voltage conductor 70 by voltage scaling means with a one to one voltage ratio in the form of a direct electrical connection. The specific sidacs selected for use in the FIG. 1 circuit each have a one hundred and thirty volt breakover voltage. As illustrated in FIG. 5A, the current flow through a sidac semiconductor device remains at a near-zero level until the sidac voltage reaches the breakover voltage. At the breakover voltage, the sidac transitions from a normal resistive mode of operation into a negative resistance mode of operation designated the foldback region in FIG. 5A. Operation within the foldback region begins at a first point defined by the breakover voltage and terminates at a second point defined by a lower operating limit voltage.

In the preferred embodiment of the FIG. 1 converter, the overvoltage protection circuit is designed to limit the maximum output voltage to two hundred and sixty volts. As the voltage level on voltage conductor 70 begins to exceed two hundred and sixty volts, sidacs 76 and 78 are operating at their breakover voltage where they begin to conduct current and enter the negative resistance foldback region. The flow of current through sidacs 76 and 78 is transmitted to resistive biasing means 74 which results in the generating of an overvoltage signal which is coupled to the base of base drive shunt transistor 24 of the power supply disabling means. This overvoltage signal activates transistor 24 and shunts all base drive current away from switching transistor 14 to ground and causes switching transistor 14 to transition from the conductive state into the non-conductive state. With switching transistor 14 in the non-conductive state, the power supply output voltage on voltage conductor 70 ramps downward for a period of time. After a comparatively short but measurable time, the voltage impressed across sidacs 76 and 78 drops to a level below the lowest voltage capable of maintaining the sidacs in the foldback region defined by the second point of the foldback region and referred to as the lower operating limit voltage. At the lower operating limit voltage, the series-connected sidacs transition from operation in their negative resistance foldback region into the normal resistive mode of operation. When this transition occurs, the flow of current through sidacs 76 and 78 terminates, resulting in the removal of the overvoltage signal from the base of transistor 24. Base drive current is once again directed to the base terminal of switching transistor 14, causing it to resume normal operation.

If the circuit defect which initially activated the overvoltage protection circuit has not been cured, the resumed converter operation will once again begin increasing the voltage on energy storage capacitor 56. When the maximum desired output voltage is achieved on voltage conductor 70, the overvoltage protection circuit is activated once again. This cycle of activating, deactivating and reactivating the overvoltage protection circuit causes the output voltage on voltage conductor 70 to fluctuate from the maximum desired output voltage to a voltage level somewhat below that level until the circuit fault is ultimately cured. Because this circuit prevents overvoltage conditions, circuit defects of the type discussed above cannot damage any elements of the FIG. 1 power supply circuit.

A zener diode which completely breaks down and commences full current conduction at a predetermined breakdown voltage cannot successfully be used as a substitute for the semiconductor means of the present overvoltage protection circuit. Substituting a zener diode for sidacs 76 and 78 would merely result in circuit oscillation about the maximum desired output voltage and would not serve the purposes of the present invention.

Figure 5B:
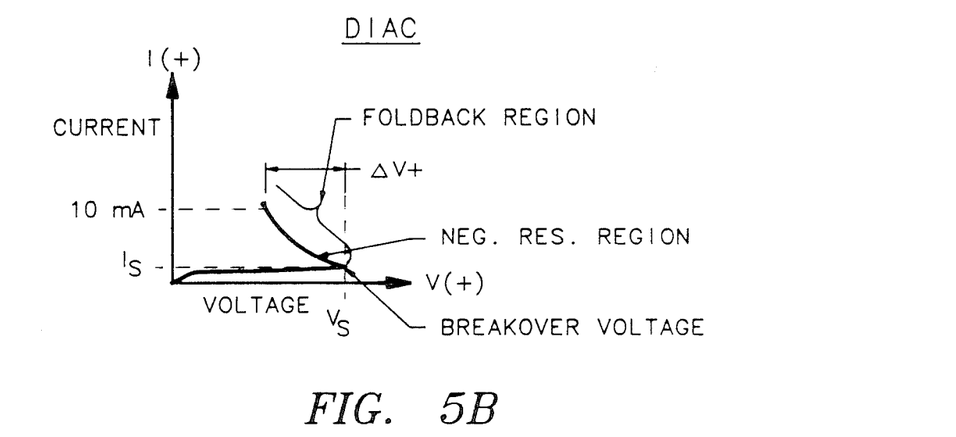

Referring now to 5B, the voltage versus current plot of a related semiconductor device designated a diac is illustrated. Although sidacs are preferred over diacs, a diac possesses the required breakover voltage/foldback region characteristics necessary for proper operation of the overvoltage protection circuit of the present invention.

Figure 5C:
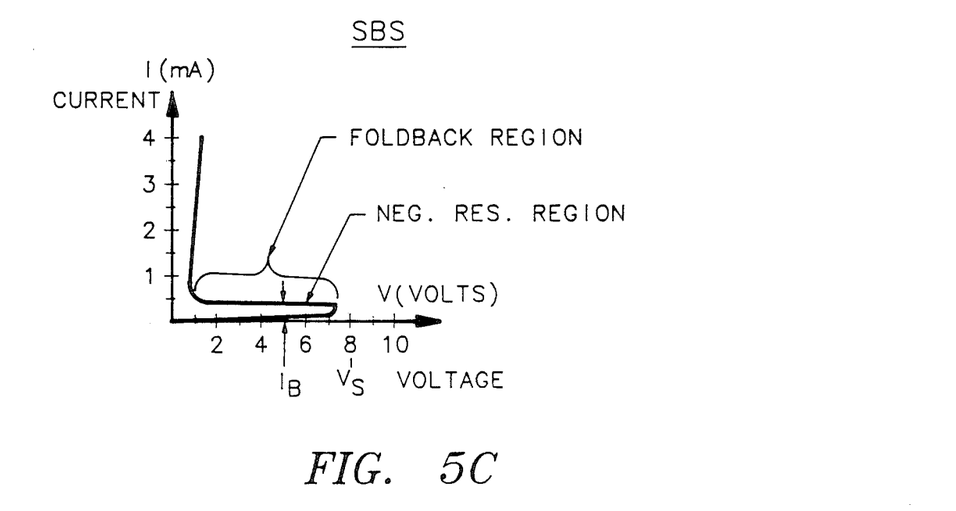

FIG. 5C illustrates the voltage versus current characteristics of another semiconductor device referred to as a silicon bilateral switch (SBS) which also possesses a breakover voltage/foldback region characteristic of the type necessary for proper operation of the overvoltage protection circuit of the present invention. Semiconductor means in the form of a sidac is strongly preferred over either the diac or SBS alternatives discussed above.

Although one terminal of sidac 76 is shown directly coupled to voltage conductor 70, that specific type of circuit configuration is not necessary for proper operation of the overvoltage protection circuit. As would be immediately recognized by a person of ordinary skill in the art, a voltage scaling network or voltage divider network could be coupled across voltage conductor 70 and ground to scale the input voltage to a sidac to thereby render a sidac having a fixed breakover voltage rating capable of functioning to activate the overvoltage protection circuit at converter output voltages substantially different than the sidac breakover voltage. Although a pair of sidacs have been depicted as being coupled in series in FIG. 1, it would be readily apparent that a single sidac may be used alone, that a variable number of sidacs could be coupled in series or that one or more sidacs could be used in connection with various voltage scaling means to cause an overvoltage protection circuit of the present invention to commence operation at any predetermined voltage.

FIG. 2 illustrates another configuration of variable impedance means 52 in the output circuit of the DC to DC converter illustrated in FIG. 1.

It will be apparent to those skilled in the art that the disclosed drive current regulator circuit, afterglow prevention circuit and overvoltage protection circuit for a DC to DC converter may be modified in numerous ways and may assume many embodiments other than the preferred embodiments specifically set out and described above. For example, the FIG. 1 circuit has been discussed in connection with a twelve to forty-eight volts DC input voltage capacity although it is readily evident that the circuit elements could easily be modified to function normally with numerous other input voltage ranges. Accordingly, it is intended by the appended claims to cover all such modifications of the invention which fall within the true spirit and scope of the invention.

I claim:

1. Apparatus for delivering current to an intermittently energized gaseous discharge tube having a low impedance conductive state and a high impedance non-conductive state, comprising:
   a. variable frequency DC to DC converter for receiving a DC input voltage, for generating a pulsed, variable magnitude output voltage and for periodically energizing said gaseous discharge tube into the low impedance conductive state, wherein the frequency of the pulsed output voltage of said converter varies between a low operating frequency and a high operating frequency in response to variations in the output voltage of said converter between a low output voltage and a high output voltage;
   b. energy storage means coupled between said converter and said gaseous discharge tube for periodically receiving and storing energy from said converter when said gaseous discharge tube is in the non-conductive state and for periodically transferring energy into said gas discharge tube when said tube is in the conductive state; and
   c. a variable impedance network coupled in series with the flow of current from said converter to said energy storage means for providing a low impedance current flow path between said converter and said energy storage means while energy is transferred from said converter into said energy storage means and for providing a high impedance current flow path between said converter and said energy storage means when said gaseous discharge tube is in the conductive state to prevent the pulsed output voltage of said converter from maintaining said gaseous discharge tube in the conductive state after the transfer of energy from said energy storage means into said gaseous discharge tube has been completed.

2. The apparatus of claim 1 wherein said variable impedance network prevents the DC input voltage of said converter from causing current to flow through said gaseous discharge tube.

3. The apparatus of claim 2 wherein said variable impedance network includes a capacitor.

4. The apparatus of claim 3 wherein the value of said capacitor is selected to present a low impedance at the high operating frequency of said converter and a high impedance at the low operating frequency of said converter to thereby prevent afterglow.

5. The apparatus of claim 4 wherein said converter includes first and second power input terminals for receiving the DC input voltage and wherein said capacitor blocks any flow of DC current from said input terminals to said gaseous discharge tube.

6. The apparatus of claim 4 wherein the operating frequency of said converter varies between a low operating frequency of from about 5,000 to 10,000 Hz to a high operating frequency of about 40,000 to 50,000 Hz.

7. The apparatus of claim 5 wherein said converter includes:
   a. a coupled inductor having a primary winding with a first terminal coupled to the first power input terminal and a second terminal;
   b. a switching transistor having a collector coupled to the second terminal of said primary winding; and
   c. said capacitor having a first terminal coupled to the second terminal of said primary winding and a second terminal coupled to said energy storage means and to said gaseous discharge tube.

* * * * *